Aug. 29, 1939.  C. R. DOWNS ET AL  2,171,109
HUMIDITY CONTROL
Filed June 27, 1936
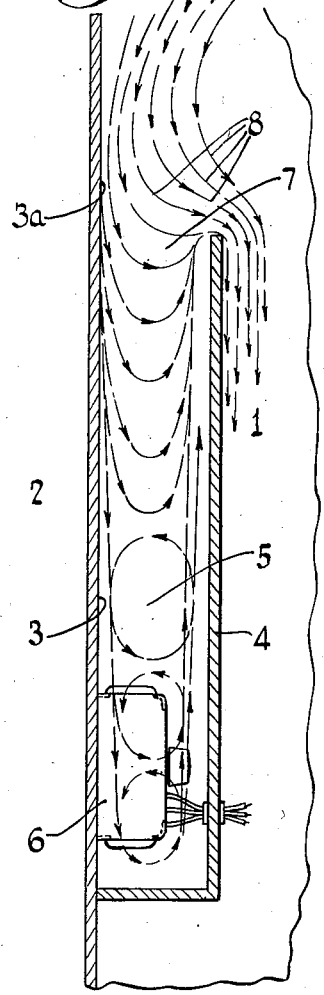
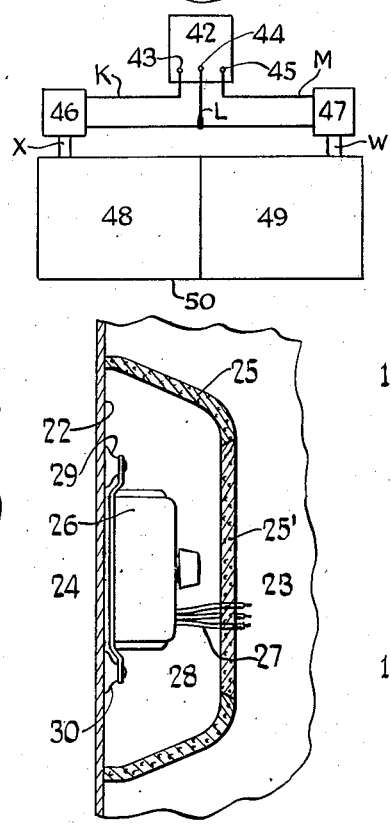
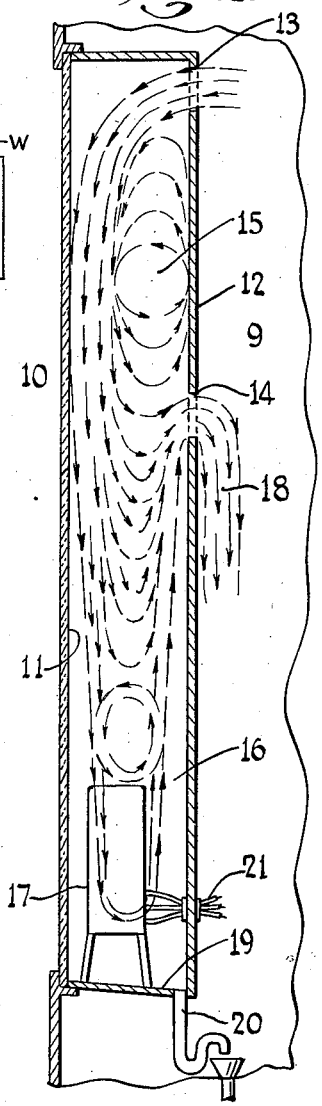
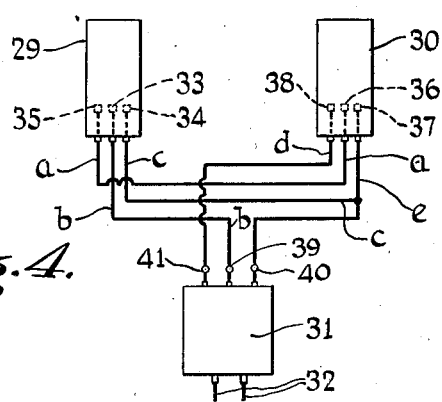
INVENTORS
CHARLES R. DOWNS
JOSEPH W. SPISELMAN
BY
ATTORNEYS Patented Aug. 29, 1939

2,171,109

UNITED STATES PATENT OFFICE 2,171,109

HUMIDITY CONTROL

Charles R. Downs, Old Greenwich, Conn., and Joseph W. Spiselman, Brooklyn, N. Y., assignors, by mesne assignments, to The Calorider Corporation, Old Greenwich, Conn., a corporation of Connecticut Application June 27, 1936, Serial No. 87,726

15 Claims. (Cl. 236—44)

This invention relates to an improvement in humidity control over that described in our copending application Ser. No. 25,596, filed June 8, 1935.

It is well known that as the outside temperature drops during winter weather, the degree of humidity which can be maintained on the inside of a building, factory, home or other enclosed space, without causing condensation of moisture on the window panes or other parts of the building, is lowered. For example, it has been found that for an inside relative humidity of 40% and temperature of 69° F. and wind velocity of 15 miles per hour, condensation of moisture on the window panes begins to appear when the outside temperature approaches 35° F. and as the outside temperatures fall, the inside relative humidities must be correspondingly lowered in order to avoid condensation of moisture on the window panes which will cloud the windows with moisture or frost or even cause a nuisance from water dripping on the window sills. With the above wind velocity and an outside temperature of 10° F. and an inside temperature of 69° F., the maximum degree of indoor relative humidity which can be maintained without condensation of moisture on the window pane is about 18% and as the outside temperature drops to 0° F., the degree of relative humidity which can be maintained inside the building drops to approximately 12%. A change in wind velocity also affects the maximum safe relative humidity that can be maintained indoors. Higher wind velocities sweeping past the windows produce a decreased temperature of the inside surface of the window panes and vice versa low wind velocities permit said inside surface to increase in temperature because the overall rate of heat transfer is reduced. In addition to the nuisance of condensation on the window panes, condensation in the outside walls and other parts of the building, with possible freezing of the condensed moisture, may do actual damage to the structure itself.

Inasmuch as winter temperatures of 10° F. and lower are not uncommon throughout a large portion of the civilized world and inasmuch as it is desirable to maintain indoor relative humidity as high as possible for the sake of health and the preservation of furniture and other equipment, without causing condensation of moisture in the walls and on window panes, it becomes increasingly desirable to control the operation of the air conditioning unit (whether operating on the principle of humidification or dehumidification) so as to maintain the maximum condition of indoor relative humidity consistent with outdoor temperatures and wind velocities.

In our copending application above identified, we have described a system and method for meeting this condition in which a humidostat is located adjacent the inside surface of an exposed panel which may be a window pane or other surface exposed to outside conditions and means are provided to induce a natural flow of air along the inner surface of the panel so that the humidity responsive element will be simultaneously subjected to the influence of the humidified air inside the enclosure and which has been cooled to a temperature corresponding to the temperature of the inner surface of the special panel. In this way the air in its passage along the panel, the outside of which is exposed to outside conditions, will be cooled, thereby increasing its relative humidity and the humidostat is set to control the operation of the air conditioning apparatus when the humidity of the air of the warmer enclosed space adjacent the panel exposed to outside atmospheric conditions approaches that at which the condensation in the walls or on the window panes of the structure would normally take place.

In the drawing accompanying the said application, we have illustrated several means for inducing or causing a natural flow or draft of air along the panel, the outside of which is exposed to outdoor atmospheric conditions, and while this method of control is more accurate and more responsive to changes in outdoor conditions than any system of control theretofore devised, we have found that as the temperature of the indoor surface of the panel drops, by virtue of a decrease in outside temperature or an increase in wind velocity, the natural air currents which are set up along the indoor surface of the panel, whether it be a storm sash window pane or a special panel inserted in the walls of the structure, increase their rate of flow.

So that, if the temperature of the air within the enclosure is maintained at approximately 70° F. in accordance with the best modern heating practice, as the outdoor temperatures and wind velocities vary, the rate of flow of the induced air currents down along the special panel also varies. That is the rate of flow of indoor air in contact with the inside surface of the panel is greater when outdoor temperatures are low and wind velocities are high. When the outdoor and indoor air temperatures approach each other, the rate of flow diminishes and stops when they are equal. This varying rate of flow of air past the humidity responsive element for varying outdoor temperatures and wind velocities causes alterations of the temperature conditions adjacent the cooled indoor surface of the panel that do not fully imitate conditions which would bring about condensation of moisture on window panes or other parts of the building. The control is not as responsive as it should be.

We have found, however, that a more sensitive and more accurate control of the operation of the humidostat described in our copending application can be brought about if instead of creating a natural draft or flow of air past the humidostat, the humidostat is located in a well or approximately dead air space which is open to the air inside the enclosure and the outside wall of which is exposed to the outside atmosphere so as to more accurately subject said air to the variations of outdoor temperatures and wind velocities prevailing at the exposed side of the well.

In this manner it is possible to maintain a correlation of inside humidity to outside temperature and wind conditions which is so accurate as to safely permit inside humidity being maintained as high as possible without condensation on the windows or in the outside walls of a building.

In the accompanying drawing, we have shown various forms of embodiment of our improvement by which the principle as well as the details of this greater degree of accuracy in control may be attained and in which Figure 1 is a diagrammatic view showing the principle of the invention in one form of embodiment;

Figure 2 shows the application of the principle in an alternate diagrammatic form;

Figure 3 shows a third method of applying the principle;

Figure 4 shows the wiring diagram for a control humidostat of the forms shown in Figures 1, 2 and 3 associated with a humidifier; and Figure 5 shows a wiring diagram for a humidostat of the forms shown in Figures 1, 2 and 3 for controlling a humidifier and a dehumidifier.

In Figure 1 numeral 1 represents the inside of an enclosed space containing a gaseous fluid such as warm air and 2 indicates the outside of the enclosed space surrounded by outdoor air or air in any other space separated from the warm gas in the enclosed space by a special panel or surface 3 whose inner surface is cooled by heat transfer by the air of the outside space 2. A partition 4 separates the main body of gaseous fluid in the space 1 from a portion thereof contained in the space 5 between the cooled panel 3 and the partition 4. The partition 4 is continuous around the sides, front and bottom of the space 5 and is preferably sealed at its edges in contact with the cooled surface or panel 3, thereby forming a casing or well for the humidostat 6. The top of the casing formed by the partition 4 and a portion of the cooled surface or panel 3 contains an opening 7 whereby the gaseous fluid in the space 5 communicates freely and solely with gaseous fluid in the space 1. Because of the fact that the surface 3 is colder than the gaseous fluid in the space 1, the gas flows downwardly by being cooled in contact with that portion of the cold surface 3 designated at 3a. Some of this cold gas flows down into the upper part of space 5 through the opening 7 but the majority of it flows in a stream indicated by the arrows 8. That portion of the gas which penetrates down into a lower level of space 5 reverses its flow to an upward direction alongside the partition 4 and joins with the bulk of the flow at 7. At the bottom of space 5, where the sensitive elements of the humidostat 6 are placed, preferably in a horizontal position so as to be evenly exposed to the humidity prevailing at the bottom of the well, the air flow practically ceases and assumes a lazy recirculating motion between the special panel or cooled surface 3 and the partition 4. This very slow motion of the gas permits it to take on substantially the temperature of the cooled surface 3 with which it is in contact. In other words, a substantially "dead air space" is created immediately surrounding the humidostat 6 where the gas in a space, because of its slight thermal circulation, approaches very closely the temperature of the panel or cold surface with which it is in contact. This substantially "dead air space" is however in moisture transferring communication with the gas contained in space 1 so that the control humidostat 6 may sensitively reflect variations in the moisture content of the gas in space 1.

The gas in the "dead air space" 5 therefore has substantially the same absolute humidity as the gas in space 1 but being at a temperature corresponding to the cooled surface 3 and lower than the average temperature prevailing in the space 1, its relative humidity is greater than that of the warmer gas in space 1. By thus locating the humidostat 6 in a substantially "dead air space" or well, such as 5, which is in communication with the space 1 and at the same time subjected to the cooling effect of the outside wall or panel 3, even major fluctuations in the temperature of the panel 3 instead of causing a speeding up of the air currents, as in our prior application Ser. No. 25,596, result in fluctuations of the temperature of the gas surrounding the humidostat 6 more comparable to the fluctuations of the outside atmospheric conditions. The latter is therefore capable of starting or stopping a humidity adjusting device to add or subtract moisture from the gas in space 1 so that its moisture content will be at a point just below that which will cause excessive condensation on the windows or other selected parts of the enclosed space.

Figure 2 shows a modification of the embodiment of Figure 1, the principle of which we have successfully used for winter humidification of a house. In this embodiment 9 represents the air in a house, 10 the outdoor atmosphere, 11 the inside "cold surface" of a portion of the outside wall structure of the house, for example a window pane, 12 the partition containing an upper air inlet opening 13, and a lower air discharge opening 14. A pre-cooling space is represented at 15 through which air is caused to flow by thermal circulation and a substantially "dead air space" is indicated at 16 in the lower portion of which the control humidostat 17 is located. The flow of air from the enclosed space 9 through the upper inlet opening 13 into the space between the surface 11 and the partition 12 and out of the discharge opening 14 is illustrated by the flow lines 18. These flow lines by their dimensional emphasis are illustrative of both the volume and the speed at which the air flows. The overall result is that all of the air which enters opening 13 at substantially the temperature prevailing in the enclosed space 9 flows through the pre-cooling space 15 and discharges through opening 14. The rate of flow of this portion of the air in the space 15 increases or decreases with lower or higher temperature variations of the cold surface 11.

From point 14 down into the "dead air space" 16, the velocity and volume of flow of the air progressively decreases and this reduction in volume of flow per unit of time permits the relatively small amount of air which penetrates into the bottom of the "dead air space" containing the humidostat 17 to be cooled to a temperature closely approximating that of the cold surface 11 even with major fluctuations of the cold surface temperature. In a structure of the kind shown in Figure 2, and made of glass, when smoke is introduced into opening 13 the flow of air currents may be observed and although this may be very rapid in the pre-cooling space 15, they are very lazy and of a re-circulating character at the bottom of the "dead air space" 16 surrounding the humidostat. In fact, when smoke is used to demonstrate these air currents, it will hang as a fog with very little motion at the bottom of the "dead air space". If the partition 12 is made of heat reflective, insulating material, its temperature so closely corresponds to the cold surface temperature that the re-circulating air currents are reduced to a minimum. In that event, moisture entering or leaving the "dead air space" may be due in large part to diffusion through the air rather than being carried by actual air currents. Such a substantially stagnant condition causes the air to closely correspond to the cold surface whether it is in direct contact therewith or some distance removed therefrom and therefore causes it to act more uniformly on the humidity responsive device 17.

Because of the necessity of a substantially "dead air space" in which the air is stagnant as disclosed above, the humidity responsive device 17 must be capable of functioning in the absence of marked air currents. This requirement is amply satisfied by instruments called humidostats whose responsive elements function by changes in dimension rather than by changes in temperature as in the case of wet bulb thermometers.

When the surface 11 is sufficiently cooled, moisture may condense thereon and the excess drain down the cold surface 11 to a pan positioned at 19 in the "dead air space" 16. If the amount collected is in excess of that which will diffuse back into the air stream and be carried out of the opening 14, it will accumulate therein until the temperature of the system rises sufficiently for this moisture to be re-evaporated. When the outside temperature drops sufficiently low, moisture deposits on the inside of the surface 11 in the form of ice or frost. This is liquefied when the outside temperature increases and liquid water will collect in the pan 19. A drain 20 may be provided to carry away this water if it is so placed that it will not be chilled to a point at which it will be plugged by freezing. Other means such as wicks may be used for the purpose or the water may be removed occasionally by hand. It has been found unnecessary to remove all the water from the pan 19 and in fact, some water in that position may exert a beneficial influence upon the humidostatic control of a humidifier when there are sharp fluctuations in outdoor temperatures between day and night.

The lead in wires 21 for the humidostat 17 may be brought in through any convenient point in the partition 12, for example through the openings 13 or 14, or directly through the wall thereof adjacent the humidostat 17 provided that when in the latter position, the aperture through which they extend is restricted to fit closely around the wires so as to prevent objectionable circulation of air therethrough and maintain the desired "dead air" around the humidostat 17.

Because of the condensation of moisture and especially frost or ice at times on the cold surface 11, such as a window pane, we prefer to use a humidostat whose binding posts are located some distance away from 11 and to attach the lead in wires at the front of the humidostat to avoid short circuiting of the electrical connections. We have found that frost and ice on a glass surface 11 behind the humidostat at times may build up a layer of as much as ¼" thick more or less, which is caused undoubtedly by the shielding effect on the cold surface 11 of the metal humidostat casing from heat radiated by the partition 12. We therefore prefer to use a humidostat possessing a solid back and also prefer to place it some distance from the window pane 11 to prevent ice and frost from depositing within the humidostat casing itself which, if permitted, would short circuit the electrical connections or interfere with the functioning of the humidity-sensitive elements.

The rate at which moisture diffuses through openings 13 and 14 is very high. For example, we have found that with an assembly such as is shown in Figure 2, the openings 13 and 14 may be very small in relation to other dimensions of the assembly and still provide sufficient responsiveness of the humidostat to control the humidity in space 9 within satisfactory limits.

Figure 3 shows another method of creating a "dead air space" in which the humidostat is located adjacent the cold surface. In this embodiment, 22 represents the internal surface of a window pane which is the "cold surface", 23 the warm air of the conditioned space in a house, 24 the outdoor cold air, 25 a porous casing through which moisture may diffuse from the air 23 to the space 28 whereby the absolute humidity of the air in spaces 28 and 23 is substantially the same. This porous case 25 is preferably constructed of heat insulating material, such as Celotex, and should be porous but of sufficiently close texture to prevent air currents from passing from 23 into 28 so that the temperature of the air in 28 will closely approach the temperature of the cold surface 22. Under these conditions, the relative humidity of the air in the "dead air space" 28 is greater than in 23. The humidostat 26 which is located with the responsive elements in horizontal position may be set for some suitable elevated relative humidity control point at which point it will start or stop a humidity altering device which may add or subtract moisture from the air in 23. For reasons stated above, we prefer to attach the lead in wires 27 to binding posts in the front of the humidostat and space the latter from the window pane 22 as illustrated. The humidostat 26 may be attached to the window pane by suction cups and brackets 29 and 30. The casing 25 may also be supported by the window pane in like manner but its edges contacting with the pane should be pressed closely against the same to prevent down-flowing air currents from passing along the window pane into the "dead air space" 28. If the humidostat requires adjustment of its setting, the casing 25 may be removed for this purpose but we prefer to provide a small removable panel or door 25' in its front surface for this purpose. The casing 25 may be made of a thin foraminous material but we prefer a relatively thick fibrous or porous structure for the sake of rigidity and for a further purpose.

As moisture drains from time to time down the window pane, either by deposition as liquid water or from the melting of frost on the window pane, it is absorbed by the edges of the porous material in contact with the glass. This water is conducted through the porous casing, is vaporized by contact with the warmer air passing in contact with its exterior surface, and thereby water is prevented from dripping on to the window sill.

The casing 25 may be wholly constructed of porous material or partly of porous material and partly of metal, glass or other non-porous material, depending upon the decorative treatment desired.

The combination of a humidostat, a "dead air space" and a cold surface as described above provides a method of maintaining the moisture content of a conditioned space at the maximum permissible amount without causing damage to the sructure conditioned or nuisance. The humidostat as described may be caused to co-operate with a humidostat placed within the conditioned space as illustrated by the wiring diagram in Figure 4. By this arrangement, the humidostat assembly as shown in Figures 1, 2 and 3 operates to control the humidity in the conditioned space in step with outdoor weather conditions and the other humidostat functions as an over-riding control to prevent the indoor relative humidity from exceeding its setting point. In cold weather reliance is placed upon the first humidostat, with the second humidostat acting as a safety device to prevent the space from being over humidified should the first humidostat fail from any mechanical defect. In moderate weather, such as in spring or fall seasons, where the first humidostat might by itself increase the relative humidity to an unnecessarily high point, the second humidostat may be used to over-ride the first. For example, it is rarely necessary or desirable to permit the air in a house to exceed 45 to 50% relative humidity. In such weather, the second humidostat may be set at this point thereby shutting off a humidifier when such a humidity is reached.

In Figure 4, 29 represents the humidostat which would be located in the "dead air space" of an assembly, such as shown in Figures 1, 2 or 3. 30 represents the usual type of humidostat as used for control purposes placed within the conditioned space. 31 represents a holding type relay which controls the power to the humidity adjusting device through leads 32, which device preferably operates either to add or subtract moisture from the air passing therethrough and into the conditioned space. Within the humidostat 29 are a moving contact 33, a high humidity contact 34, and a low humidity contact 35. Similarly, there are corresponding contacts 36, 37 and 38 respectively in humidostat 30. Within the relay, there are three connections, 39 is a neutral connection, 40 is a connection which on connection with 39 causes a cessation of the power flow through leads 32, and 41 is a connection which on connection with 39 causes a resuming of power flow through leads 32.

From the contacts in humidostat 29, a wire $a$ leads from contact 35 to contact 36 of humidostat 30, a wire $b$ extends from contact 33 to connection 39, and a wire $c$ from contact 34 to the line to connection 40. From the contacts in humidostat 30, a wire $d$ extends from contact 38 to connection 41 and wire $e$ from contact 37 to connection 40.

The various connections function as follows. Assume that the conditioned space requires humidification. Contact 36 in humidostat 30 is then bearing on contact 38. Assume also that in the "dead air space" in which the humidostat 29 is located the relative humidity is also lower than the setting of the humidostat. Contact 33 is then bearing on contact 35, and a circuit is completed from connection 39 through wire $b$, contact 33, contact 35, wire $a$, contact 36, contact 38, wire $d$ and connection 41 to cause the start of a humidifier. The conditioned space is then being humidified. After a period of operation, the humidity in the conditioned space is increased to the point where the humidity in the "dead air space" around the humidostat 29 exceeds the relative humidity setting of the humidostat 29. Thereupon contact 33 separates from contact 35 and moves toward contact 34. The circuit from 39 to 41 is opened by this act, but the humidifier is kept running by the holding type relay until contact 33 bears on contact 34. When this occurs, a circuit is completed from connection 40, through wire $c$, contact 34, contact 33, wire $b$ and connection 39, whereupon the relay lets go and the power supply to the humidifier ceases.

Suppose that during the humidification, outdoor conditions are such that before the humidity in the dead air space exceeds the setting of the humidostat 29, the relative humidity in the conditioned space reaches the setting of humidostat 30. Thereupon, contact 36 separates from contact 38, breaking the circuit from 39 to 41. The humidifier continues operating due to the relay until the humidity within the conditioned space becomes somewhat higher, causing contact 36 to bear on contact 37. Thereupon, a circuit is completed from connection 40 through wire $e$, contact 37, contact 36, wire $a$, contact 35, contact 33, wire $b$ and connection 39, causing the relay to let go and stop the humidifier.

In this manner, the humidostat in the conditioned space will over-ride the humidostat adjacent to the cold surface of assembly 29. There can be no chance of operating to short circuit connection 40 to connection 41 with subsequent damage, since the moving contacts break any possible circuit between the two.

In Figure 4, when the moving contact 33 in assembly 29 bears on contact 34, the humidifier is immediately turned off. On the other hand, the humidostat 30 cannot stop the humidifier, should the moving contact 33 be between contacts 34 and 35. In most cases when humidostat 30 is in the position to stop the humidifier, the contact 33 will bear on contact 35 so that the humidifier will be stopped. However if 33 should not be in contact with 35 but is moving toward 34, only a slight increase in the relative humidity of the conditioned space will cause a greater increase of the relative humidity at the cold surface adjacent 29 and will soon cause contact 33 to bear on 34 to stop operation without appreciable over-humidification.

The humidostat 29, because it is surrounded by air at a decreased temperature and at an increased relative humidity due to the fact that it is in the "dead air space", is much more sensitive and responsive to changes in absolute humidity than humidostat 30.

While Figure 4 illustrates connections, such as would be used with a humidity adding device, a similar wiring system with connections 40 and

41 interchanged will be used when the humidostats 29 and 30 are used to control the operation of a dehumidifying device. Such dehumidifying devices are needed where excessive amounts of moisture are liberated within or introduced into enclosed spaces, such as restaurants, theatres, factories and gas holders.

In Figures 1, 2 and 3 we have illustrated the humidostats 6, 17 and 26 in horizontal position, that is, with the humidity responsive elements, such as the hairs, lying in a horizontal plane, so that the hairs are subjected uniformly to the greater degree of relative humidity prevailing at the bottom of the well. It will be understood, however, that the humidostats could be located so that the elements, in the direction of their greatest length, would be in a vertical or inclined plane. The horizontal arrangement, however, gives the greatest sensitivity.

Where the humidostat is used to control a system which may be required to remove humidity from an enclosure at one time, and add humidity at other times, the arrangement shown in Figure 5 may be used. Here the humidostat 42 in the "dead air space" is wired directly or through relays to a humidity altering device 50, one portion 48 of which can act as a dehumidifier, and another portion 49 as a humidifier. The humidostat 42 adjacent the cold surface has a low humidity contact 43, a moving contact 44, and a high humidity contact 45.

From contact 43 a wire $k$ is led to a simple relay 46, which in turn has power leads $x$ to the humidifying portion 48 of the humidity altering machine 50. From contact 45 a wire $m$ is drawn to a simple relay 47, which in turn has power leads $w$ to the dehumidifying portion 49 of the humidity altering device 50. From moving contact 44 a common lead $l$ goes to relays 46 and 47.

When the conditioned space requires humidification, contact 44 in humidostat 42 will bear on contact 43. Relay 46 is thereupon energized through wires $k$ and $l$ and power flows to the humidifying portion 48 of unit 50 through wires $x$. As the humidity increases in the enclosure, a point will be reached when the contact 44 will move away from contact 43, thereupon relay 46 is de-energized and the operation of the humidifying portion 48 ceases.

Should the humidity increase above the required point, contact 44 will move and bear upon contact 45. Relay 47 is thereupon energized through wires $l$ and $m$ and power flows to the dehumidifying portion 49 of the humidity altering device 50 through wires $w$ causing it to operate as the humidity decreases in the enclosure, a point will be reached where the contact 44 moves away from contact 45, and relay 47 is de-energized and the power flow to portion 49 ceases. In this manner either an increase or decrease in the relative humidity adjacent the humidostat 42 will automatically cause the moving contact 44 to make contact with contacts 43 or 45 to bring about the desired modification of conditions within the enclosure controlled by humidostat 42.

While we have shown a humidity altering device 50 composed of two parts, one for humidifying and the other for dehumidifying, it is to be understood that these two functions may also be performed in any suitable single unit providing successively both humidifying and dehumidifying cycles.

While we have described several arrangements whereby the advantage of a "dead air space" surrounding a humidostat and yet subject to diffusion of air from within the enclosed space and to the cold of the surrounding space may be attained, it will be obvious that various other arrangements operating on the principle of our invention may be made.

We claim:

1. The method of controlling the humidity of a heated enclosure, which includes controlling the operation of an air conditioning unit adapted to add moisture to or withdraw moisture from the air of said enclosure, in accordance with the relative humidity of the air in a substantially dead air space in moisture diffusing communication solely with the air in said enclosure, but subject to temperature change due to outside conditions.

2. The method of controlling the humidity of an enclosed space, which includes directing into the top of a dead air space a portion only of a convection current of the air in said enclosed space induced by colder conditions outside of said enclosed space, and controlling the humidity altering apparatus for said enclosed space in accordance with the relative humidity of substantially quiescent air in the lower portion of said dead air space.

3. An apparatus for preventing condensation of moisture from the heated humidified air of an enclosure on an outside wall of the enclosure cooled by exposure to colder outside atmospheric conditions, which includes a humidifier for said enclosure, a humidostat for stopping and starting said humidifier, and means for maintaining a relatively small substantially quiescent body of air around the sensitive element of said humidostat, said quiescent body of air being in indirect heat transfer relationship but out of direct communication with the outside air, and having sufficient open communication with the air in said enclosure to permit diffusion of moisture thereto or therefrom.

4. An apparatus for controlling the relative humidity of air of an enclosure, which includes, a means for altering the relative humidity of the air in said enclosure, means for maintaining a substantially quiescent body of air in heat transferring relationship with a surface of said enclosure which is colder than the average air within said enclosure, said body having sufficiently open communication with the air in said enclosure to permit rapid diffusion of moisture thereto and therefrom, and a humidostat having its sensitive element within said substantially quiescent body of air for controlling said first mentioned means.

5. A humidostat control device containing a humidity sensitive element which by change of dimension is adapted to control humidity altering apparatus, said device having means for preventing the flow of air past its humidity sensitive element but permitting the passage of moisture thereto and therefrom.

6. The combination with a humidifying apparatus arranged to supply moisture to the air of a room, of a humidostat positioned against the inner surface of a panel of said room, the outer surface of which is exposed to the outside atmosphere at a reduced temperature, said humidostat being connected to control said humidifying apparatus, means for directing a current of room air along a portion of said panel toward said humidostat and means to substantially stop the flow of air adjacent said humidostat to create a substantially dead air space thereabout.

7. An apparatus for controlling the humidity of the air within an enclosure comprising, in combination, a humidity adjusting apparatus and means for controlling said apparatus, comprising a well communicating at the top with the air in said enclosure and substantially closed at the bottom, said well having one wall exposed to the colder outside atmosphere, and a humidostat located with its humidity responsive elements in horizontal position adjacent the bottom of said well and means in said humidostat to control the stopping and starting of said humidity adjusting apparatus in accordance with variations in the relative humidity adjacent the bottom of said well.

8. An apparatus for controlling the humidity within an enclosure comprising, in combination, a humidity adjusting device and means for controlling said device comprising a humidostat in a dead air space adjacent the inner surface of a panel in the wall of said enclosure, the outer surface of which is exposed to the colder outside atmosphere, said dead air space being separated from the air of the enclosure by a porous partition through which moisture can diffuse and said humidostat being connected to control the humidity adjusting device.

9. An apparatus for dehumidifying air within an enclosure and for maintaining its dewpoint below the temperature of a selected portion of the wall of said enclosure comprising, in combination, a dehumidifying device and means for controlling said device comprising a humidostat in a dead air space adjacent said wall portion, said dead air space being separated from the air of said enclosure by a porous partition through which moisture can diffuse and said humidostat being connected to control the dehumidifying device.

10. A system for controlling the humidity within an enclosure comprising, in combination, an air conditioning apparatus and means for controlling said apparatus comprising a humidostat exposed to the air of substantially average condition within the room, and arranged to control the air conditioning apparatus in response to predetermined maximum and minimum humidity conditions, means for maintaining a substantially stagnant body of air exposed to temperature changes dependent upon outside atmospheric conditions and in restricted communication with the air of said room, and a second humidostat in said substantially stagnant body of air, arranged to take over control of the conditioning apparatus in response to predetermined relative humidity conditions in said stagnant and cooled air.

11. A system for controlling the amount of moisture added to air within an enclosure having an interior surface responsive to exterior changes in temperature comprising a humidifying apparatus for supplying moisture to the air within said enclosure, humidity responsive means positioned within said enclosure for starting or stopping said humidifying apparatus when the relative humidity of air within said enclosure deviates from a predetermined point, and a second humidity responsive means positioned in close proximity to said surface and responsive to the relative humidity of enclosed air adjacent said surface for suspending operation of said humidifying apparatus when the relative humidity of the enclosed air adjacent said surface reaches a predetermined degree and means to create a substantially dead air space adjacent said surface and surrounding said second humidity responsive means and communicating with said enclosure.

12. The method of controlling the relative humidity of a gas in an enclosure having a cold surface, which includes maintaining a substantially dead gas space in moisture transferring communication with the warmer gas in said enclosure but responsive to temperature changes at said surface, and altering the relative humidity of the gas in said enclosure in accordance with the relative humidity of the gas in said substantially dead gas space.

13. A system for controlling the moisture content of the air within an enclosure, having an interior surface responsive to exterior changes in temperature, comprising a humidity modifying apparatus for changing the moisture content of the air within said enclosure, humidity responsive means positioned within said enclosure for controlling the operation of said humidity modifying apparatus when the relative humidity of air within said enclosure deviates from a predetermined content, a second humidity responsive means positioned in close proximity to said surface and responsive to the relative humidity of enclosed air adjacent to said surface, for taking over the operation of said humidity modifying apparatus when the relative humidity of the enclosed air adjacent to said surface reaches a predetermined degree, and means for maintaining a substantially quiescent body of air adjacent to said surface and surrounding said second humidity responsive means and communicating with said enclosure.

14. In combination a humidostat having a humidity responsive element, means to support said element adjacent to the inside surface of a window pane the outside surface of which is exposed to outside weather conditions, and means for maintaining a substantially quiescent body of air around said humidity responsive element and in contact with the inside surface of said window pane.

15. In combination a humidostat having a humidity responsive element, means for supporting said element near one side of an enclosure partition the opposite side of which is exposed to varying temperature conditions, and means for maintaining a substantially quiescent body of air in contact with said first mentioned side of said enclosure partition and around said humidity responsive element, whereby said quiescent body of air is subjected to temperature changes responsive to varying temperature conditions on the opposite side of said partition and is exposed to the humidity conditions existing in said enclosure.

CHARLES R. DOWNS.
JOSEPH W. SPISELMAN.